United States Patent [19]

Takahashi et al.

[11] Patent Number: 4,641,697
[45] Date of Patent: Feb. 10, 1987

[54] PNEUMATIC TIRE TREAD FOR HEAVY DUTY TRUCKS

[75] Inventors: Ken Takahashi, Atsugi; Osamu Takahashi, Hiratsuka, both of Japan

[73] Assignee: The Yokohama Rubber Co., Ltd, Tokyo, Japan

[21] Appl. No.: 770,933

[22] Filed: Aug. 30, 1985

[30] Foreign Application Priority Data

Aug. 31, 1984 [JP] Japan .................. 59-180749

[51] Int. Cl.⁴ ............................. B60C 11/04
[52] U.S. Cl. ................................. 152/209 R
[58] Field of Search ........... 152/209 R, 209 D, 209 B, 152/DIG. 3, 523

[56] References Cited

U.S. PATENT DOCUMENTS 3,373,790 3/1968 Newman et al. ............... 152/209 R
3,512,566 5/1970 Verdier ........................ 152/209 R
4,078,596 3/1978 Nakayama et al. .......... 152/DIG. 3
4,364,426 12/1982 Mills et al. ..................... 152/209 R

OTHER PUBLICATIONS

1978 Tread Design Guide, Bennett Garfield publication, Commack, NY, pp. 114, 129.

Primary Examiner—Michael Ball
Attorney, Agent, or Firm—Armstrong, Nikaido, Marmelstein & Kubovcik

[57] ABSTRACT

A pneumatic tire for heavy duty trucks, provided in the tread thereof with lug grooves, auxiliary grooves having smaller depth and smaller width than the lug grooves, one-side ends of the auxiliary grooves opening into lateral walls of the lug grooves, and a shelf part disposed on the lateral walls of the lug grooves containing the openings at a level flush with the bottom surface of the auxiliary grooves.

3 Claims, 15 Drawing Figures

PNEUMATIC TIRE TREAD FOR HEAVY DUTY TRUCKS

BACKGROUND OF THE INVENTION

This invention relates to a pneumatic tire for heavy duty trucks.

Generally pneumatic tires for heavy duty trucks, as means of compatibly fulfilling two contradicting properties, one of ensuring traction and the other of warranting wear life, have main grooves (rib grooves M, lug grooves 3, etc.) and auxiliary grooves 4 of a smaller width than the main grooves disposed in a tread 1 as shown in FIG. 11 illustrating a part of a tire tread. The distribution of the auxiliary grooves 4 of a smaller width in the tread 1 is intended to impart an enhanced gripping property to the tire without an appreciable decrease in the actual treading area ratio of the tire.

Generally, the auxiliary grooves 4 are designed to furnish the tire with the gripping property without an appreciable sacrifice of the actual treading area ratio. It is, therefore, usual for the width of these auxiliary grooves 4 to be restrained in the range of 2 to 8 mm, i.e. 1 to 4% of the developed width D of the tread 1.

It is most desirable from the standpoint of traction that the depth of the auxiliary grooves 4 to be equal to that of lug grooves 3 constituting part of the main grooves. In the surface (tire tread) as viewed in its developed state, since the auxiliary grooves 4 are disposed preponderantly toward tread shoulders 2, an addition to the depth of the auxiliary grooves 4 tends to induce localized wear of the tread shoulders 2. The depth of the auxiliary grooves, therefore, is generally selected in design so as to fall in the range of 30 to 80% of the depth of the lug grooves 3 with due respect to the balance between the resistance to wear and the traction.

Incidentally, while the tire remains in contact with the ground, surface strain is concentrated on the bottom surface of the auxiliary grooves 4 because the tread is constantly exposed to compressive stress.

The tread shoulders 2 have a smaller radius from the rotary axle of the tire than the tread center 1a. On the assumption that the tread surface falls in one plane, the tread shoulders 2 are subject to greater displacement and the concentration of strain is proportionately large on the bottom surface of the auxiliary grooves 4 which are located toward the tread shoulders 2. Further, since the lug grooves 3 open into the tread shoulders 2, series of blocks arranged intermittently in the circumferential direction T of the tire constitute the tread shoulders. When the tire using the tread constructed as described above is set in place on the drive axle, therefore, the tread shoulders 2 are destined to sustain the surface strain due to the shear force which is exerted on the tread for transmission of the drive torque to the road surface.

In the bottom portions of the rib grooves M which continue generally along the circumferential direction T of the tire, the surface strain is generally in the form of compressive strain. The lug grooves 3 and the auxiliary grooves 4 which open into the lug grooves are mostly arranged in the direction of radius (namely the direction perpendicular to the circumferential direction T of the tire) owing to the requirement for traction and, therefore, are subject to repeated exertion of compressive strain and tensile strain. Owing to the repetitive exertion of these strains synergistically coupled with the high absolute levels of these strains, cracks occur preponderantly on the bottom surface of the lug grooves 3 disposed in the tread shoulders 2, with the deterioration (ozone cracks) of the tread rubber and the minute cuts as contributing causes.

In the pneumatic tire for a heavy duty truck which has a tread pattern illustrated in FIG. 11, the concentration of surface strain occurs preponderantly in opening parts 5 of the auxiliary grooves 4 in which lateral walls 6' of the lug grooves 3 opposed to the opening parts 5 of the auxiliary grooves 4 intersect the auxiliary grooves 4. Thus, cracks are most liable to originate in edge parts of the bottom surface of the auxiliary grooves 4. Further, since the portions sustaining such cracks are exposed to repeated exertion of strains during the travel of the vehicle, the growth of cracks proceeds inwardly in the tire wall and tends to result in total loss of serviceability or recapability of the tire.

Heretofore, alleviation of the surface strain and repression of the occurrence of cracks have been attained by smoothly rounding the corners of the edge parts 9 of the bottom surface of the auxiliary grooves in the openings 5 of the auxiliary grooves 4 where the lateral wall parts 6' and the auxiliary grooves 4 intersect each other as illustrated in FIG. 12 and FIG. 4 which depict cross sections taken through FIG. 11 along the line A—A. Unfortunately, this method has given no satisfactory solution to the problem because the concentration of strain still occurs around the edge parts 5 of openings of the auxiliary grooves. In FIG. 12 and FIG. 14, 7 denotes a bottom surface of the auxiliary grooves 4 and 8 a lateral wall part of the auxiliary grooves 4. FIG. 13 and FIG. 14 depict cross sections taken through FIG. 11 along the line B—B. FIG. 13 represents the case wherein the depth d of the auxiliary grooves 4 is large and FIG. 14 the case wherein the depth d is small. In FIG. 12, 3d denotes the depth of the lug grooves 3.

As another measure to cope with the problem, there has been tried a method for repressing the level of concentration of strain by either decreasing the depth of the auxiliary grooves 4 or approximating the proportions depth d and the width of the grooves to each other as much as possible as illustrated in FIG. 14. The decrease of the depth d of the auxiliary grooves 4, however, results in a drop of the traction during the early stage of wear. The increase of the width of the auxiliary grooves 4 brings about a decrease in the actual tread area ratio and inevitably entails a decrease of wear life.

SUMMARY OF THE INVENTION

An object of this invention is to provide a pneumatic tire for heavy duty trucks, which is enabled to preclude occurrence of cracks in edge parts of the bottom surface of auxiliary grooves and enjoy improvement in wear resistance and traction owing to an elaborate design of the construction of lateral walls of lug grooves in which the auxiliary grooves open.

To be specific, this invention resides in a pneumatic tire for a heavy duty truck, provided in the tread thereof with lug grooves opening into tread shoulders and auxiliary grooves having smaller depth and smaller width than the lug grooves and having one-side ends thereof opening into lateral walls of the aforementioned lug grooves, which pneumatic tire is characterized by disposing on the lateral walls of the aforementioned lug grooves containing the openings of the auxiliary grooves a shelf part at a level flush with the bottom surface of the auxiliary grooves.

The object described above and other objects of the present invention will become apparent from the further disclosure of the invention given below.

DETAILED DESCRIPTION OF THE INVENTION

Figure 1:
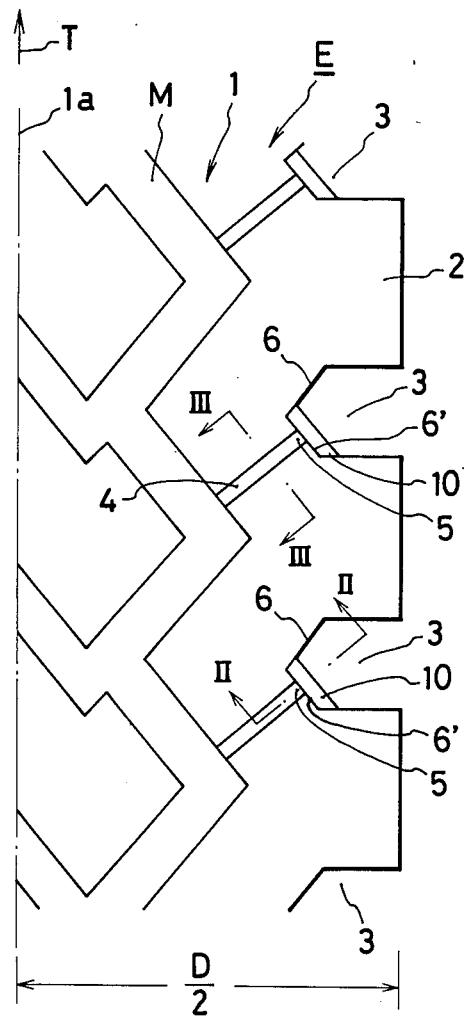
FIG. 1 is an explanatory diagram illustrating in plan view one portion of the tread of a pneumatic tire of this invention for heavy duty trucks.
Figure 2:
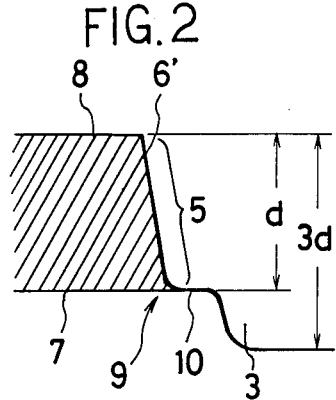
FIG. 2 is an enlarged cross section taken through FIG. 1 along the line II—II.
Figure 3:
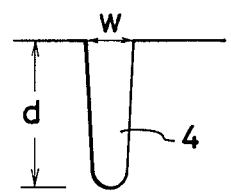
FIG. 3 is an enlarged cross section taken through FIG. 1 along the line III—III.

In FIG. 1, E represents a typical tread pattern formed on the tread side of the pneumatic tire of this invention for heavy duty trucks. This tread pattern contains lug grooves 3 constituting main grooves of the tire and opening into tread shoulders 2 and auxiliary grooves 4 having smaller depth d and smaller width w than the lug grooves 3, with one-side ends of the auxiliary grooves 4 opened into lateral walls 6' of the aforementioned lug grooves 3.

This invention, specifically, has a step-like shelf part 10 formed at a level flush with the bottom surface 7 of the auxiliary grooves on the lateral walls 6' of the lug grooves containing the opening parts 5 of the auxiliary grooves.

To be more specific, the present invention has originated in cognizance of the fact that the bottom surface 7 of the auxiliary grooves 4 is interrupted by the opening parts 5 and the edge parts 9 of the bottom surface are susceptible to concentrated exertion of strain because the auxiliary grooves 4 opening into the lug grooves 3 is given a smaller depth d than the depth 3d of the lug grooves 3 in due consideration of localized wear. By forming, in the regions wherein the auxiliary grooves 4 have their opening parts 5 join the lug grooves 3, a step-like shelf 10 having the upper surface flush with the bottom surface 7 of the auxiliary grooves 4 and having a width greater than the width of the bottom surface 7 of the auxiliary grooves 4 and disposed on the lateral walls 6' of the aforementioned lug grooves containing the opening parts 5 of the auxiliary grooves, this invention enables the strain concentrated in the edge parts 9 of the bottom surface of the opening parts 5 of the auxiliary grooves 4 to be shifted to and dispersed in the aforementioned shelf part 10 and allows the absolute level of the concentrated strain to be lowered.

In the illustrated embodiment, the breadth L of the aforementioned shelf part 10 is substantially 4 mm and the width of the shelf part 10 covers the entire width of the lateral walls 6' of the lug grooves 3 which are intersected by the auxiliary grooves 4. The corners formed between the bottom surface 7 and the lateral walls 6' of the auxiliary grooves, between the bottom surface 7 of the auxiliary grooves and the lateral walls 6 of the lug grooves, and between all the surfaces mentioned above and the shelf part 10 are invariably rounded smoothly with a radius of 1 to 1.5 R.

Figure 4:
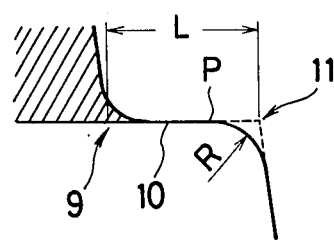
FIG. 4 is an explanatory diagram illustrating an essential part of FIG. 2 as enlarged.

In this case, the substantial breadth L of the shelf part 10 may be considered as that of the region defined by the lines of intersection between the imaginary extensions of the surfaces (indicated by dotted lines) enveloping the shelf part 10 as illustrated in FIG. 4 which depicts the shelf part 10 in an enlarged state because the corners are rounded as described above.

When the radius R with which the corner at the edge part 11 of the shelf part 10 is rounded is so large that the tangent point P falling on the arc of the radius R excessively approaches the edge part 9 of the bottom surface of the auxiliary groove, the requirement for the construction of this invention is not fulfilled because the situation is not different from the case in which the edge part 11 of the bottom surface of the auxiliary groove is interrupted by the opening part 5 of the auxiliary groove. For this invention to be fully effective, therefore, the portion of the shelf part 10 remaining after the corner of the bottom surface 11 of the shelf part has been rounded with the radius R is desired to be not less than L/2 at the level flush with the bottom surface of the auxiliary groove.

Now, working examples of the invention will be cited below.

EXAMPLE 1

A conventional tire, a comparative tire, and a tire of the present invention described below were subjected to road test.

Figure 11:
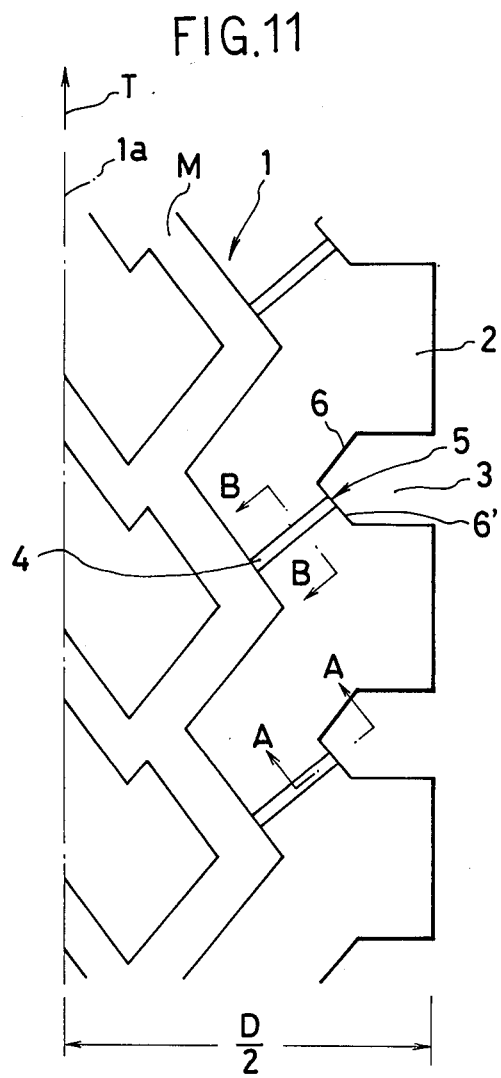
FIG. 11 is an explanatory diagram illustrating in plan view one portion of the tread of the conventional pneumatic tire for heavy duty trucks.
Figure 12:
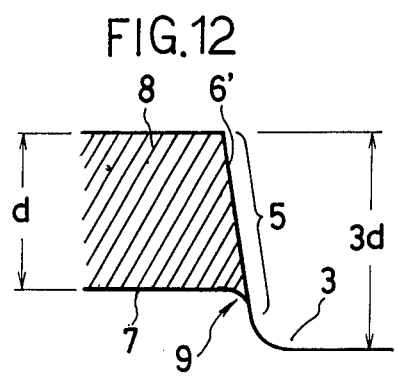
FIG. 12 is an enlarged cross section taken through FIG. 11 along the line A—A.
Figure 13:
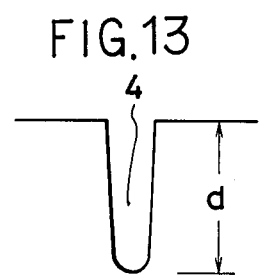
FIG. 13 is an enlarged cross section taken through FIG. 11 along the line B—B.

(1) Conventional tire (FIG. 11 through FIG. 13)

This tire was designed as a traction tire of a size of 11R 22.5. It has a developed tread width D of 220 mm, lug grooves 3 as main grooves and zigzag grooves M in the circumferential direction formed in a depth of 17.5 mm, and auxiliary grooves formed in a depth d of 13 mm. The bottom surface of the auxiliary grooves 4 had a width of 3 mm, with the corner chamferred with a radius of 1.5R. The corner portion of the edge part 9 in the opening part of the auxiliary groove was treated so as to be rounded with a radius of 2R.

Figure 14:
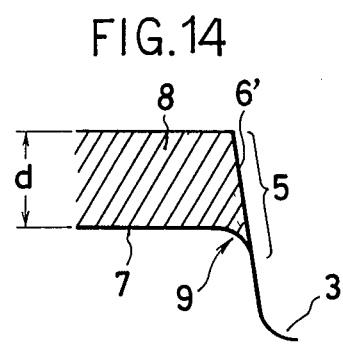
FIG. 14 is another cross section taken through FIG. 11 along the line A—A.
Figure 15:
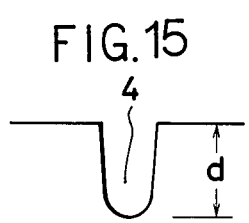
FIG. 15 is another enlarged cross section taken through FIG. 11 along the line B—B.

(2) Comparative tire (FIG. 11, FIG. 14, and FIG. 15)

This tire had a size 11R 25.5. The developed tread width D was 220 mm, the depth of the lug grooves was 17.5 mm, and the depth of the zigzag grooves M was 17.5 mm. As illustrated in FIG. 14, the depth d of the auxiliary grooves 4 was 8 mm, representing a decrease of 5 mm as compared with the aforementioned conventional tire. The bottom surface of the auxiliary groove 4 had a width of 5 mm as chamferred with a radius of 2R. The corner portion at the edge part 9 of the opening of the auxiliary groove was treated so as to be rounded with a radius of 3 to 4R. By rounding the corner so that the ratio of the width w to the depth d, w/d, would be large and the radius R with which the corner at the edge part 9 of the bottom surface of the auxiliary groove would be also large, the level of concentrated strain on the bottom surface 7 of the groove was lowered.

(3) Tire of this invention (FIG. 1 through FIG. 4)

This tire had a size 11R 22.5. The developed tread width D was 220 mm, the depth of the lug grooves 3 was 17.5 mm, the depth of the zigzag grooves M was 17.5 mm, and the depth d of the auxiliary grooves 4 was 13 mm. The bottom surface of the auxiliary grooves 4 had a width of 3 mm as chamferred with a radius of 1.5R. Besides the grooves constructed in the conventional tire described above, a shelf part 10 of the shape of a step was formed at a level flush with the bottom surface of the auxiliary groove on the lateral walls of the lug grooves intersecting the auxiliary grooves 4. The breadth L of the shelf part 10 was substantially 4 mm. The corner at the edge part 11 of the shelf part 10 was rounded. The portion of the shelf part 10 remaining after the removal of the corner so rounded was more than half of the breadth L of the shelf part 10.

Road test:

The effect demonstrated in the road test is particularly manifested in the tire exposed to the rotational torque exerted by the driving of vehicle. The tire of a fixed size of 11R 22.5 14 PR was set in place on a rim 8.25×22.5 and subjected to the following test conditions.

As the test vehicle, a high-output tractor of an axle type 6×4 having an engine output of 355 horsepower. Although the drive axles of the tractor are designed to be normally fitted with eight tires, dual wheels and tires, a total of four tires were set in place, single wheel and tire so that each of the tires would be exposed to rotational torque twice as large as the normal magnitude.

As regards load and inflation condition, inflation pressures of 7.38 kg/cm$^2$ (105 psi) designated as the maximum load by the TRA Standard. The load exerted on the tractor was adjusted so that a load of 2740 kg (6040 lbs) would be exerted on each of the tires.

In the aforementioned conventional tire, comparative tire, and tire of the present invention, the groove patterns were formed by curving prescribed patterns in one third circumferential section of one and the same tire mold. In the dies so fabricated, rubber stock was molded and vulcanized. In these tires, lug grooves 3 were formed as circumferentially spaced at a total of 96 pitches. In each of the tires, the grooves were formed at a total of 64 positions covering both sides of the tread.

In the road test, the conventional tire was confirmed to sustain cracks in part of the opening parts of the auxiliary grooves by a check given at a mileage of 25,600 km (16,000 miles).

The comparative tire was found to sustain first cracks by a check given at a mileage of 67,200 km (42,000 miles).

The tire of the present invention was found to sustain first cracks by a check given at a mileage of 76,800 km(46,000 miles).

The road test was discontinued at a mileage of 80,000 km (50,000 miles).

All the tires, four in each test lot, were examined in all the pitches involved for presence or absence of cracks and for surface length of cracks. The results are shown as distribution diagrams in FIG. 5 (conventional tire), FIG. 6 (comparative tire), and FIG. 7 (tire of this invention).

Figure 5:
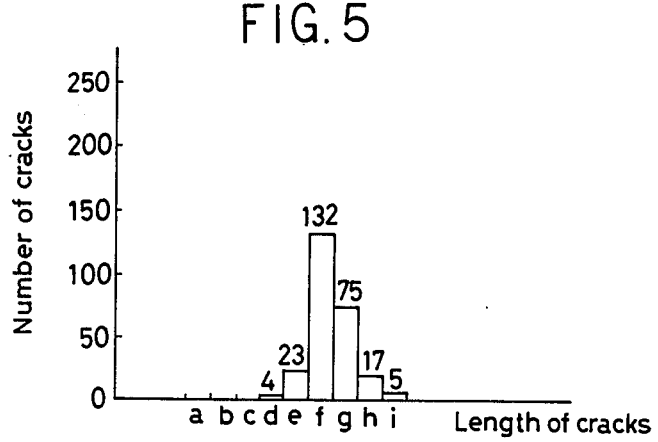
FIG. 5 is a graph showing the relation between the length of cracks and the number of cracks formed in the conventional tire.
Figure 6:
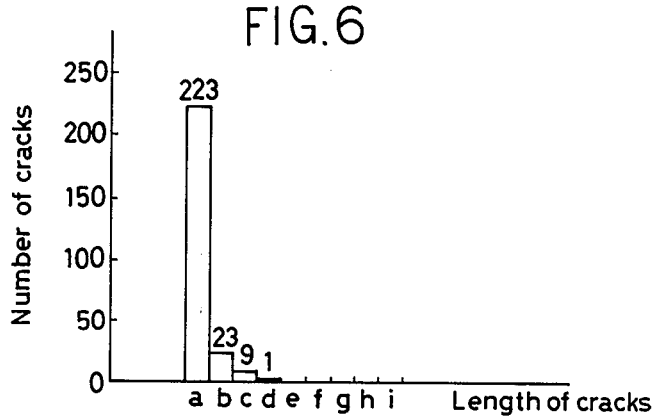
FIG. 6 is a graph showing the relation between the length of cracks and the number of cracks formed in a comparative tire.
Figure 7:
FIG. 7 is a graph showing the relation between the length of cracks and the number of cracks formed in the tire of this invention.

In FIGS. 5 to 7, the vertical axis represents the scale indicating the number of cracks formed and the horizontal axis represents the scale indicating the length of cracks. The length of cracks was rated by the 9-point (a through i) scale as shown in Table 1 below.

TABLE 1 a . . . 0 (no crack)
b . . . 0.1 to 4.9 mm
c . . . 5.0 to 9.9 mm
d . . . 10.0 to 14.9 mm
e . . . 15.0 to 19.9 mm
f . . . 20.0 to 24.9 mm
g . . . 25.0 to 29.9 mm
h . . . 30.0 to 34.9 mm
i . . . 35.0 mm and over It has been confirmed through consumers' experiments that any tire giving results of the level of the comparative tire shown in FIG. 6 in the road test performed under the conditions described above is passed as possessing satisfactory quality in terms of cracks under the working conditions of general acceptance in the market.

From the test results, it is noted that when the groove construction contemplated by this invention is adopted, the tire can be expected to repress the occurrence of cracks at a level equalling to or exceeding the level of the comparative tire shown in FIG. 6 without requiring the depth d of the auxiliary grooves 4 to be decreased or the width w of the same grooves to be increased.

EXAMPLE 2

Figure 8:
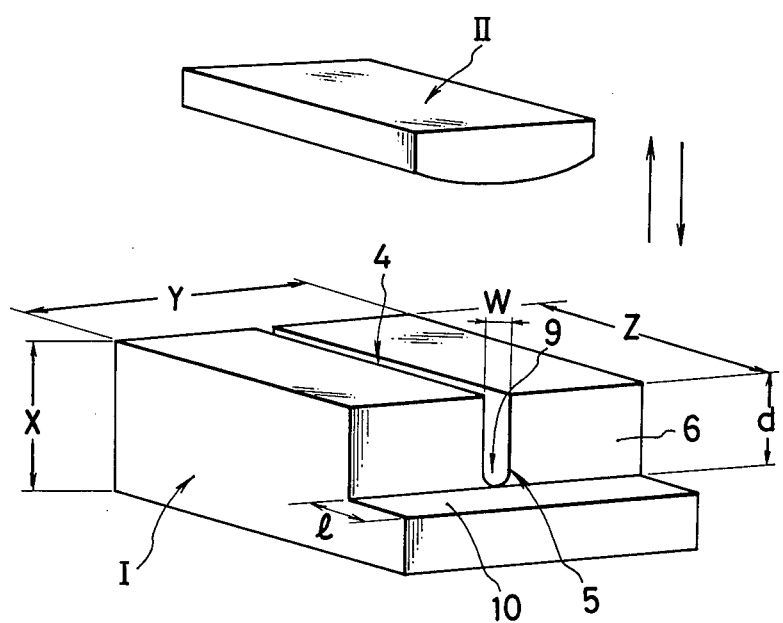
FIG. 8 is an explanatory diagram illustrating in perspective view a rubber sample and an impact head.

A rubber sample I (having the dimensions where X=20 mm, Y=40 mm, and Z=40 mm) was fabricated which contained an auxiliary groove 4 and a shelf part 10 as shown in FIG. 8, simulating the auxiliary grooves and the shelf part used in the tread contemplated by the invention. In the portion of this rubber sample I corresponding to the edge part 9 of the bottom surface of the auxiliary groove, a cut 5 mm in length and 1.5 mm in depth was inserted with a scalpel along the direction of the groove. An impact head II shaped after a blotting pad as illustrated was used to beat repeatedly the rubber sample I in such a manner that the protuberance of the impact head II would land on the center of the groove 4 simulating an auxiliary groove. At the 500,000th impact, the rubber sample I was examined to find the growth of the scalpel cut.

This test was conducted under the following conditions.

Figure 9:
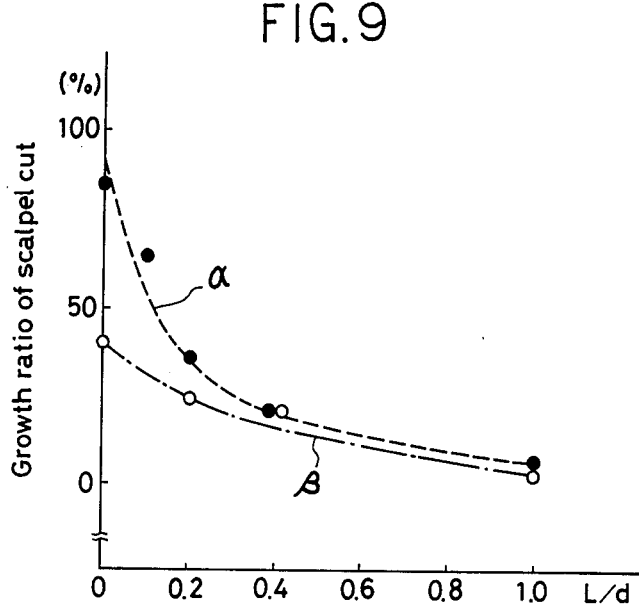
FIG. 9 is a graph showing the relation between the L/d and the growth ratio of scalpel cut in the rubber sample.

Temperature of atmosphere: 80° C.
Weight of impact head including attached weight: 17 kg
Height of drop of impact head: 28 mm So many rubber samples as to contain notches, simulating an auxiliary groove, of two different depths, d, of 10 mm and 15 mm and a fixed width, w, of 4 mm and portions simulating a shelf part 10 and having the ratio of breadth L to d varied in several levels were prepared and used in the test. The results of the test are shown in FIG. 9. It is noted from the data on the relation between the growth ratio of scalpel cut and L/d that the resistance to growth of cracks in the edge part 9 of the bottom surface in the opening part of the auxiliary grooves can be improved by increasing the breadth of the shelf part 10.

Figure 10:
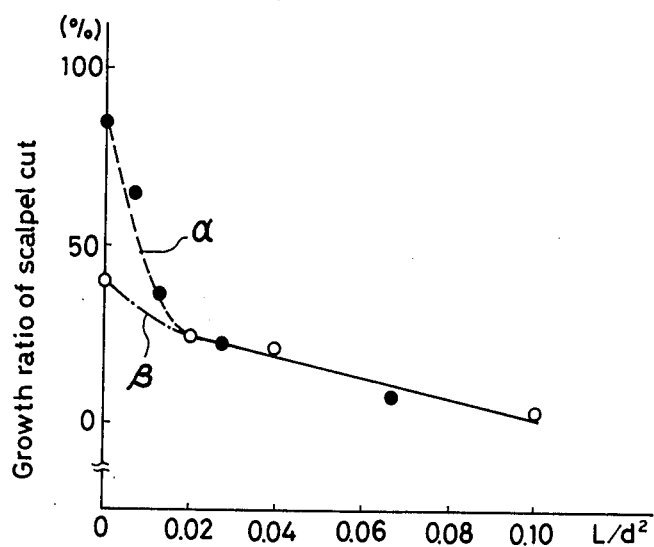
FIG. 10 is a graph showing the relation between the $L/d^2$ and the growth ratio of scalpel cut in the rubber sample.

When the data of the graph of FIG. 9 are replotted with respect to the relation between the growth ratio of scalpel cut and $L/d^2$ ($=L/d \times 1/d$), there are obtained the data of FIG. 10. It is noted from FIG. 10 that the relation between the depth d of the auxiliary groove 4 and the breadth L of the shelf part 10 is desired to be such that the value, $L/d^2$, will exceed 0.013, preferably 0.02.

In FIG. 9 and FIG. 10, the curve $\alpha$ represents the data obtained of rubber samples containing notches (simulating an auxiliary groove) of a depth d of 15 mm and the curve $\beta$ the data obtained of rubber samples containing notches of a depth d of 10 mm.

The tread of the tire according to the present invention has a shelf part formed at a level flush with the bottom surface of the auxiliary grooves on the lateral walls of lug grooves containing opening parts of the auxiliary grooves. This shelf part serves to preclude occurrence of cracks in the edge parts of the bottom surface of the auxiliary grooves and consequently contributes to enhancing wear resistance and improving traction. The tires produced by the present invention can be used advantageously even on light trucks and buses.

What is claimed is:

1. A pneumatic tire for heavy duty trucks, provided in the tread thereof with lug grooves opening into tread shoulders and auxiliary grooves having smaller depth and smaller width than said lug grooves and having one-side ends thereof opening into lateral walls of said lug grooves and the other ends thereof opening into the lateral walls of main circumferential grooves, which pneumatic tire is characterized by disposing on said lateral walls of said lug grooves containing said openings of said auxiliary grooves a shelf part at a level flush with the bottom surface of said auxiliary grooves, wherein the shelf part extends into the lug grooves.

2. A pneumatic tire for heavy duty trucks according to claim 1, wherein the corner at the edge part of the surface of said shelf part is rounded smoothly.

3. A pneumatic tire for heavy duty trucks according to claim 2, wherein the portion of said shelf part remaining after removal of said corner by said rounding is not less than one half or the breadth L of said shelf part.

* * * * *